US005699216A

United States Patent [19]

Doty

[11] Patent Number: 5,699,216

[45] Date of Patent: Dec. 16, 1997

[54] ERASURE PREVENTING THUMBWHEEL FOR SINGLE REEL CARTRIDGES

[75] Inventor: Charles T. Doty, Troy, Wis.

[73] Assignee: Imation Corp., Oakdale, Minn.

[21] Appl. No.: 933,090

[22] Filed: Aug. 21, 1992

[51] Int. Cl.[6] .................... G11B 15/04

[52] U.S. Cl. .................... 360/132; 360/60

[58] Field of Search .................... 360/132, 60; 242/197, 242/199, 344

[56] References Cited

U.S. PATENT DOCUMENTS

| | | | |
|---|---|---|---|
| 4,012,011 | 3/1977 | Saito | 360/132 |
| 4,320,421 | 3/1982 | Larson et al. | 360/132 |
| 5,209,424 | 5/1993 | Fischer et al. | 242/197 |

OTHER PUBLICATIONS

Research Disclosure 25038, "File Protect Detent and Sleeve".

*Primary Examiner*—Stuart S. Levy
*Assistant Examiner*—William R. Korzuch
*Attorney, Agent, or Firm*—Eric D. Levinson

[57] ABSTRACT

An erasure preventing thumbwheel is located in the front wall of a cartridge and is rotatable in an opening in the front wall. The thumbwheel has a larger diameter central portion which is exposed through the opening and includes a flat section which corresponds in size and shape to the opening. When the flat section registers with the opening, the tape is write-protected. The thumbwheel has a circumferential ridged gripping portion at one edge of the central portion which extends around the non-flat cylindrical section of the thumbwheel. The gripping portion does not extend along the edge of the flat section.

10 Claims, 3 Drawing Sheets

64
68
66
76
74
70

ERASURE PREVENTING THUMBWHEEL FOR SINGLE REEL CARTRIDGES

TECHNICAL FIELD

The present invention relates to tape cartridge erasure preventing devices for use in single reel cartridges. More particularly, the present invention relates to erasure preventing devices to enable a mechanism of the recorder to sense the status of the cassette.

BACKGROUND OF THE INVENTION

Single reel data tape cartridges, one generation of which is known as 3480 type cartridges, include a reel containing magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the take-up reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes a roller guide, an air bearing guide, a magnetic transducer head, a second air bearing guide, and a roller of a tension transducer.

The tape drive apparatus also includes a mechanism which interacts with the tape cartridge to sense whether the tape is write-enabled and can be erased and recorded over or whether the tape is write-protected and can not be erased. Typical erasure preventing devices for these single reel cartridges typically incorporate a mechanism that senses whether a record opening in a wall of the cassette is blocked or unblocked. When the opening is unblocked, the recording function is disabled to prevent accidental erasure.

Another erasure preventing device is illustrated in FIG. 1. This mechanism is a cylindrical thumbwheel which is rotatable in an opening in the front wall of the cartridge near the corner opposite the corner that has the leader block window. The thumbwheel 64' has a larger diameter central portion 66' which is exposed through the opening and two smaller diameter end portions 68', 70' which are received and rotatable in a boss in the cartridge housing. The central portion 66' includes a flat section 74' which corresponds in size and shape to the opening in the front wall of the cartridge. When the thumbwheel 64' is rotated so the flat section 74' registers with the opening, the tape is write-protected. When the thumbwheel 64' is rotated so the flat section 74' does not register with the opening, the tape is write-enabled.

The thumbwheel 64' has a circumferential ridged gripping portion 76' at one axial edge of the central portion 66'. The gripping portion 76' extends completely around the thumbwheel 64' to facilitate rotating the thumbwheel. However, while the gripping portion permits intentional rotation of the thumbwheel between the write-enabled and write-protected positions, the gripping portion also increases the chances of inadvertently rotating the thumbwheel from the write-protected position to the write-enabled position and permitting valuable data to be erased.

SUMMARY OF THE INVENTION

A single reel data tape cartridge according to the present invention includes a reel of magnetic tape with a leader block attached to the free end of the tape as it extends from the reel. The tape cartridge is used within a tape drive apparatus which includes a mechanism which interacts with the tape cartridge to sense whether the tape is write-enabled or whether the tape is write-protected. The front wall has a record opening which interacts with the cartridge drive systems.

An erasure preventing device is located in the front wall of the cartridge in an opening near the corner opposite the corner that has the leader block window. The opening is interactable with the cartridge drive system. The erasure preventing device is a cylindrical thumbwheel which is rotatable in the opening. The thumbwheel has a larger diameter central portion which is exposed through the opening and two smaller diameter end portions which are received and rotatable in a boss in the cartridge housing. The central portion includes a flat section which corresponds in size and shape to the opening in the front wall of the cartridge. When the thumbwheel is rotated so the flat section registers with the opening, the tape is write-protected. When the thumbwheel is rotated so the flat section does not register with the opening, the tape is write-enabled.

The thumbwheel has a circumferential ridged gripping portion at one axial edge of the central portion. The gripping portion extends around the non-flat cylindrical section of the thumbwheel to facilitate rotating the thumbwheel. The gripping portion permits intentional rotation of the thumbwheel from the write-enabled to the write-protected position. The gripping portion does not extend along the edge of the flat section, thereby reducing the chances of inadvertently rotating the thumbwheel to the write-enabled position and permitting valuable data to be erased. The ends of the flat section can be beveled to further inhibit inadvertent rotation of the thumbwheel.

DETAILED DESCRIPTION OF PREFERRED EMBODIMENTS

Figure 1:
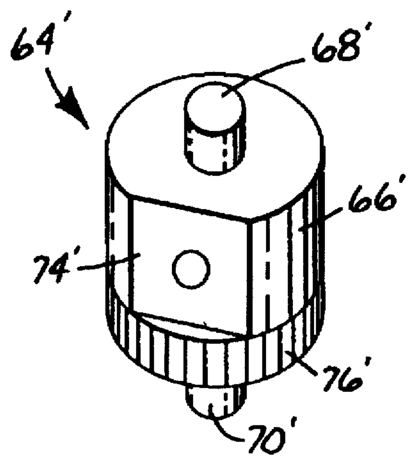
FIG. 1 is a perspective view of a known thumbwheel.

A single reel data tape cartridge 10 includes a reel 12 containing magnetic tape 14 with a leader block 16 attached to the free end 18 of the tape 14. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window is covered.

The front surface of the leader block 16 includes a slot 24 for engaging an automatic threading apparatus of a reel-to-reel magnetic tape drive apparatus and is generally cylindrical, having a rounded boss which engages an inclined surface of the corner of the cartridge 10. The rear surface is rounded 26 to form a portion of an arc of a radius to match the periphery of the take-up reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the take-up reel. The tape reel 12 includes a cylindrical hub 28 having a cylindrical tape winding surface, an upper flange 32 mounted on one axial end of the hub, and a lower flange 34 mounted on the other axial end of the hub.

The cartridge 10 is formed of a base 36 and a cover 38 which combine to form a housing. The base 36 includes a rear wall 40, two opposing side walls 42, a front wall 46, and a lower wall 48 connecting the rear, front, and side walls. The cover 38 includes a rear wall, two opposing side walls 54, a front wall 56, and an upper wall 58 connecting the rear, front, and side walls. The lower wall 48 and the upper wall 58 are the major walls of the housing.

The tape drive apparatus includes a mechanism which interacts with the tape cartridge 10 to sense whether the tape 14 is write-enabled or whether the tape is write-protected. The front wall 46, 56 of the cartridge has a record opening 60 which is interactable with the cartridge drive system. An erasure preventing device is locatable in the record opening 60. When the erasure preventing device blocks the record opening 60, the tape 14 is write-enabled and can be erased. When the erasure preventing device unblocks the record opening 60, the tape drive apparatus mechanism disables the recording function to prevent accidental erasure. The tape 14 is write-protected and cannot be erased.

Figure 3:
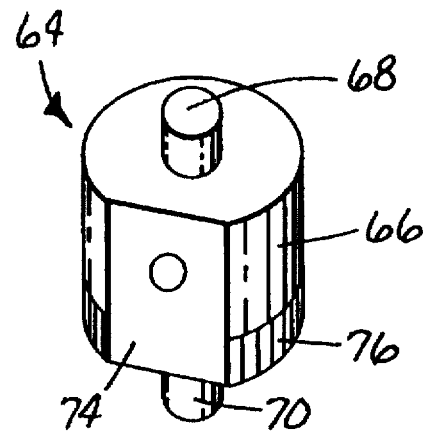
FIG. 3 is a perspective view of the thumbwheel of FIG. 2.

An erasure preventing device, best shown in FIG. 3, is located in the front wall 56 of the cartridge 10 in an opening 60 near the corner 62 opposite the corner that has the leader block window 22. The opening 60 is interactable with the cartridge drive system. The erasure preventing device is a cylindrical thumbwheel 64 which is rotatable in the opening 60. The thumbwheel 64 has a larger diameter central portion 66 which is exposed through the opening and two smaller diameter end portions 68, 70 which are received and rotatable in a boss 72 in the cartridge housing. One end portion 68, 70 is located on each axial end of the central portion 66. The central portion 66 includes a flat section 74 which corresponds in size and shape to the opening 60 in the front wall 56 of the cartridge 10. When the thumbwheel 64 is rotated so the flat section 74 registers with the opening 60, the tape 14 is write-protected. When the thumbwheel 64 is rotated so the flat section 74 does not register with the opening 60, the tape 14 is write-enabled.

The thumbwheel 64 has a circumferential ridged or serrated gripping portion 76 at one axial edge of the central portion 66. The gripping portion 76 extends around the non-flat central portion 66 of the thumbwheel 64 to facilitate rotating the thumbwheel. The gripping portion 76 permits intentional rotation of the thumbwheel 64 from the write-enabled to the write-protected position. The gripping portion 76 does not extend along the axial edge of the flat section 74, thereby increasing the difficulty in rotating the thumbwheel 64 from the write-enabled to the write-protected position. This reduces the chances of inadvertently rotating the thumbwheel 64 to the write-enabled position and permitting valuable data to be erased. Rotating the thumbwheel 64 from the write-protected to the write-enabled position requires a concentrated effort and or the use of tools such as a fingernail, a pen, or a knife.

Figure 4:
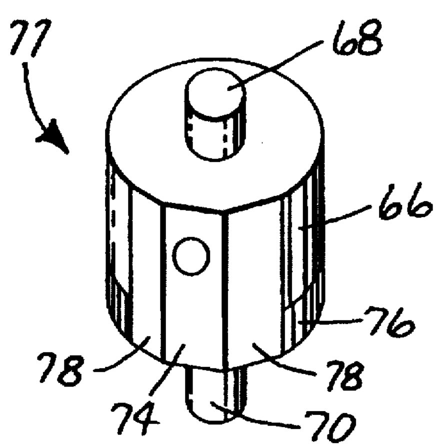
FIG. 4 is a perspective view of a thumbwheel according to another embodiment of the present invention.
Figure 5:
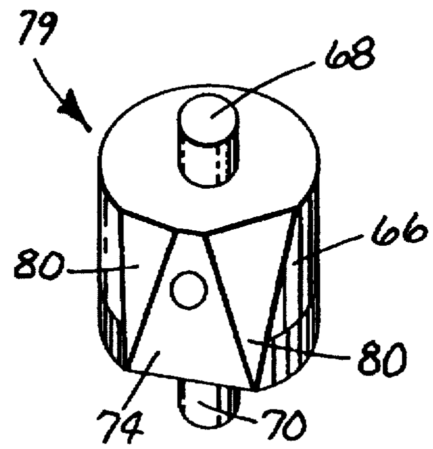
FIG. 5 is a perspective view of a thumbwheel according to another embodiment of the present invention.
Figure 2:
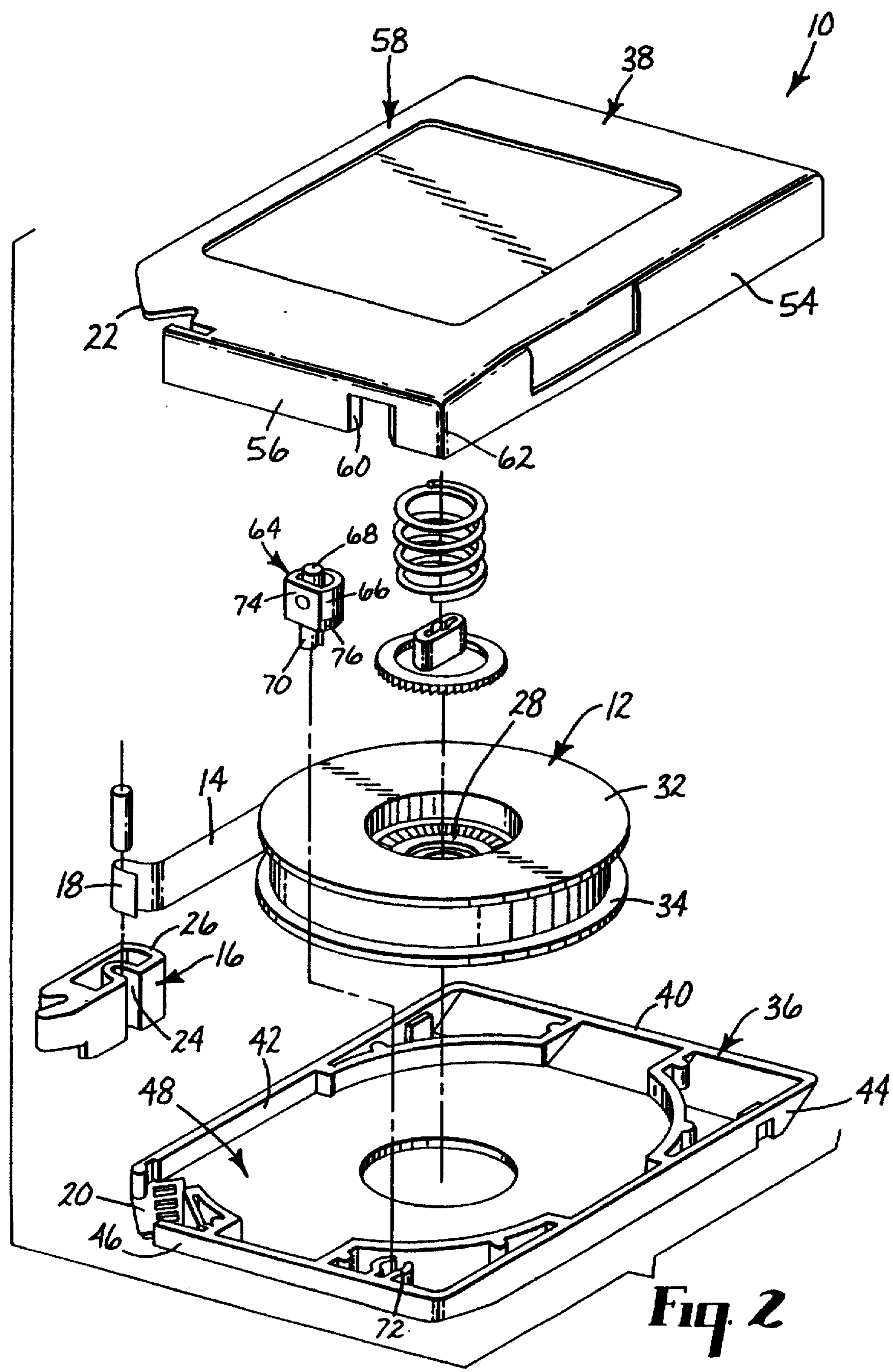
FIG. 2 is an exploded perspective view of a single reel cartridge having a thumbwheel according to the present invention.

The ends of the flat section 74 can be beveled 78 or rounded to further inhibit inadvertent rotation of the thumbwheel 77, as shown in FIG. 4. This further increases the difficulty in rotating the thumbwheel to the write-enabled position. Additionally, the ends of the thumbwheel 79 can be tapered 80 as shown in FIG. 5. Again, this further increases the difficulty in rotating the thumbwheel to the write-enabled position. Alternatively, the ends of the flat section can be rounded, beveled, and/or tapered while retaining the gripping portion 76 on the flat section. This embodiment is not as difficult to rotate from the write-protected to the write-enabled position as those described above. However, as the tactile feel and resistance are different in going from write-enabled to write-protected than going from write-protected to write-enabled, this configuration could adequately prevent accidental erasures.

Modifications such as these are within the ANSI standards for 3480 type single reel cartridges regarding the location of the thumbwheel and the allowable torque required to rotate the thumbwheel. Moreover, these modifications to the thumbwheel obviate any need to modify any of the other portions of the cartridge, keeping manufacturing costs down.

Figure 6A:
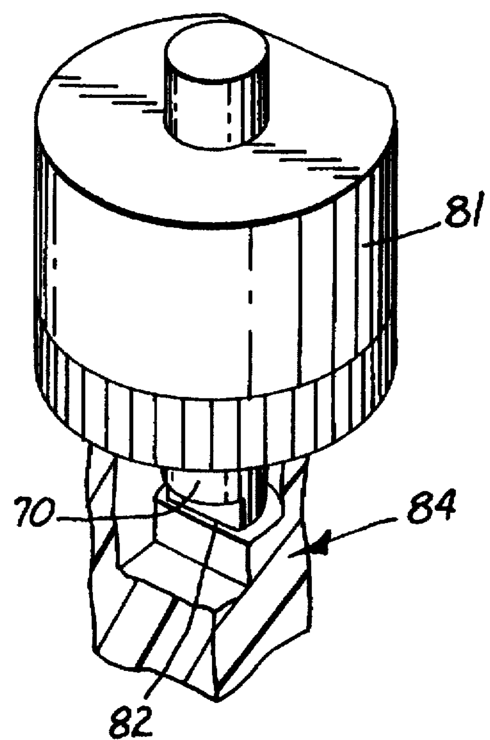
FIG. 6A is a perspective view of a thumbwheel according to another embodiment of the present invention in the write-enabled position.
Figure 6B:
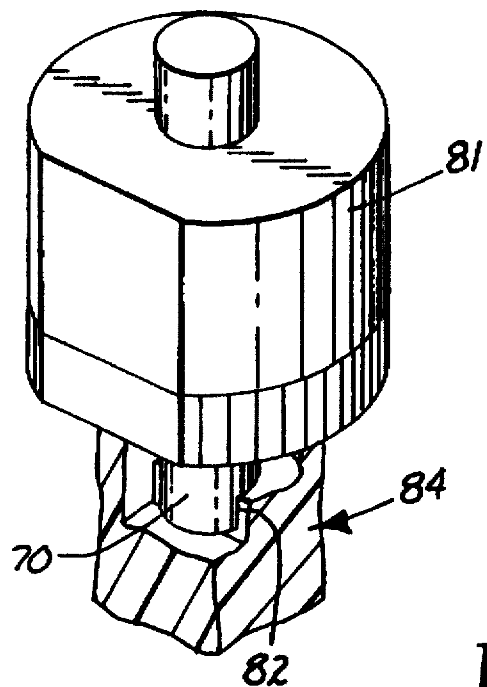
FIG. 6B is a perspective view of the thumbwheel of FIG. 6A in the write-protected position.

In alternative embodiments, one of the end portions 68, 70 can be modified to increase the effort required to rotate the thumbwheel 64 from the write-protected position to the write-enabled position. Referring to FIG. 6, the end portion 70 of the thumbwheel 81 could be formed with a cutout portion 82 and the boss 72 formed with a stepped portion 84. In the write-enabled position, the end 86 of the end portion 70 is above and contacts the stepped portion 84, as shown in FIG. 6A. When the thumbwheel 81 is rotated 180° to the write-protected position, the cutout portion 82 receives the stepped portion 84, as shown in FIG. 6B. Reorienting the thumbwheel 81 from the write-protected position to the write-enabled position requires first raising the thumbwheel 81 so that the end portion 70 no longer engages the stepped portion 84 and then rotating the thumbwheel 81. A biasing device such as a coil spring could be used to bias the thumbwheel 81 downwardly to control the amount of resistance required to move the thumbwheel 81 to the write-enabled position. Alternatively, the end portion 70 can be slotted and received on a web formed in the boss 72. This system is also biased downwardly.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention.

I claim:

1. An erasure preventing device for tape cartridges wherein the cartridge includes a housing having a front wall and a boss, wherein the front wall has an opening which is interactable with a cartridge drive system and the erasure preventing device is located in the front wall and comprises a cylindrical thumbwheel which is rotatable in the opening, wherein the thumbwheel comprises:

a larger diameter central portion which is exposed through the opening;

a first smaller diameter end portion located on one axial end of the central portion and which is rotatably received in the boss;

a flat section disposed on the central portion and corresponding in size and shape to the opening such that when the thumbwheel is rotated so the flat section registers with the opening, the cartridge is write-protected and when the thumbwheel is rotated so the flat section does not register with the opening, the cartridge is write-enabled;

a non-flat section disposed on the central portion; and a circumferential ridged gripping portion located at one axial edge of the central portion and extending around only the non-flat cylindrical section of the thumbwheel to facilitate rotating the thumbwheel and permitting intentional rotation of the thumbwheel from the write-enabled position to the write-protected position, wherein the ridged gripping portion stops at the ends of the flat section that serve as the border between the flat section and the non-flat section to inhibit inadvertent rotation of the thumbwheel.

2. The erasure preventing device of claim 1 wherein the ends of the flat section that serve as the border between the flat section and the non-flat section are beveled to further inhibit inadvertent rotation of the thumbwheel.

3. The erasure preventing device of claim 1 wherein the thumbwheel further comprises a second smaller diameter end portion located on the axial end of the central portion opposite the first smaller diameter end portion and which is received and rotatable in a boss in the cartridge housing.

4. The erasure preventing device of claim 1 wherein the cartridge is a single reel tape cartridge.

5. The erasure preventing device of claim 1 further comprising means mounted on the first end portion for preventing the thumbwheel from rotating from the write-protected position to the write-enabled position unless accompanied by axial movement of the thumbwheel.

6. An erasure preventing device for tape cartridges wherein the cartridge includes a housing having a front wall and a boss, wherein the front wall has an opening which is interactable with a cartridge drive system and the erasure preventing device is located in the front wall and comprises a cylindrical thumbwheel which is rotatable in the opening, wherein the thumbwheel comprises:

a larger diameter central portion which is exposed through the opening;

a flat section disposed on the central portion and corresponding in size and shape to the opening such that when the thumbwheel is rotated so the flat section registers with the opening, the cartridge is write-protected and when the thumbwheel is rotated so the flat section does not register with the opening, the cartridge is write enabled;

a non-flat section disposed on the central portion;

a circumferential ridged gripping portion located at one axial edge of the central portion and extending around only the non-flat cylindrical section of the thumbwheel to facilitate rotating the thumbwheel and permitting intentional rotation of the thumbwheel;

a first smaller diameter end portion located on one axial end of the central portion and which is rotatably received in the boss; and means mounted on the first end portion for preventing the thumbwheel from rotating from the write-protected position to the write-enabled position unless accompanied by axial movement of the thumbwheel, wherein the preventing means comprises a cutout portion formed on the first end portion which is engagable with a stepped portion in the housing boss, wherein in the write-enabled position the end of the first end portion is above and contacts the stepped portion and the thumbwheel is free to rotate, and in the write-protected position the cutout portion receives the stepped portion and rotating the thumbwheel requires first raising the thumbwheel so that the first end portion no longer engages the stepped portion.

7. A single reel tape cartridge having a housing, a reel of tape housed within the housing, wherein the housing includes a front wall and a boss, wherein the front wall has an opening which is interactable with a cartridge drive system, and means located in the front wall for preventing erasure wherein the erasure preventing means comprises a cylindrical thumbwheel which is rotatable in the opening and wherein the thumbwheel comprises:

a larger diameter central portion which is exposed through the opening;

a first smaller diameter end portion located on one axial end of the central portion and which is rotatably received in the boss;

a flat section disposed on the central portion and corresponding in size and shape to the opening such that when the thumbwheel is rotated so the flat section registers with the opening, the tape is write-protected and when the thumbwheel is rotated so the flat section does not register with the opening, the tape is write-enabled;

a non-flat section disposed on the central portion; and a circumferential ridged gripping portion located at one axial edge of the central portion and extending around only the non-flat cylindrical section of the thumbwheel to facilitate rotating the thumbwheel and permitting intentional rotation of the thumbwheel from the write-enabled position to the write-protected position, wherein the ridged gripping portion stops at the ends of the flat section that serve as the border between the flat section and the non-flat section to inhibit inadvertent rotation of the thumbwheel.

8. The cartridge of claim 7 wherein the ends of the flat section that serve as the border between the flat section and the non-flat section are beveled to further inhibit inadvertent rotation of the thumbwheel.

9. The cartridge of claim 7 wherein the thumbwheel further comprises a second smaller diameter end portion located on the axial end of the central portion opposite the first smaller diameter end portion and which is received and rotatable in a boss in the cartridge housing.

10. The cartridge of claim 7 further comprising means mounted on the first end portion for preventing the thumbwheel from rotating from the write-protected position to the write-enabled position unless accompanied by axial movement of the thumbwheel.

* * * * *